US008676627B2

(12) United States Patent
Gerth et al.

(10) Patent No.: US 8,676,627 B2
(45) Date of Patent: Mar. 18, 2014

(54) VERTICAL PROCESS MERGING BY RECONSTRUCTION OF EQUIVALENT MODELS AND HIERARCHICAL PROCESS MERGING

(75) Inventors: Christian Gerth, Detmold (DE); Thomas Gschwind, Zurich (CH); Jochen M. Kuester, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 12/328,323

(22) Filed: Dec. 4, 2008

(65) Prior Publication Data
US 2010/0145746 A1 Jun. 10, 2010

(51) Int. Cl.
*G06Q 10/00* (2012.01)
(52) U.S. Cl.
USPC ........................................ 705/7.27; 705/7.26
(58) Field of Classification Search
CPC ... G06Q 10/0633; G06Q 10/06; G06Q 10/10; G06Q 10/06316; G06Q 10/063; G06Q 10/0631
USPC ................................................ 705/7.27, 7.26
See application file for complete search history.

(56) References Cited

U.S. PATENT DOCUMENTS

| | | | | | |
|---|---|---|---|---|---|
| 5,233,513 | A | * | 8/1993 | Doyle | 705/7.11 |
| 5,918,232 | A | * | 6/1999 | Pouschine et al. | 707/999.002 |
| 5,987,247 | A | * | 11/1999 | Lau | 717/100 |
| 6,006,193 | A | * | 12/1999 | Gibson et al. | 705/7.26 |
| 6,212,530 | B1 | * | 4/2001 | Kadlec | 707/999.102 |
| 6,275,977 | B1 | * | 8/2001 | Nagai et al. | 717/104 |
| 6,292,830 | B1 | * | 9/2001 | Taylor et al. | 709/224 |
| 6,339,838 | B1 | * | 1/2002 | Weinman, Jr. | 717/104 |
| 6,507,856 | B1 | * | 1/2003 | Chen et al. | 715/205 |
| 6,954,758 | B1 | * | 10/2005 | O'Flaherty | 707/802 |
| 7,058,588 | B2 | * | 6/2006 | Young et al. | 705/7.26 |
| 7,168,077 | B2 | * | 1/2007 | Kim et al. | 718/106 |
| 7,222,302 | B2 | * | 5/2007 | Hauser et al. | 715/734 |
| 7,386,797 | B1 | * | 6/2008 | Chatterjee et al. | 715/751 |
| 7,428,519 | B2 | * | 9/2008 | Minsky et al. | 706/47 |
| 7,503,032 | B2 | * | 3/2009 | Bhaskaran et al. | 717/104 |
| 7,506,302 | B2 | * | 3/2009 | Bahrami | 717/100 |
| 7,694,272 | B2 | * | 4/2010 | Bronicki et al. | 717/109 |

(Continued)

OTHER PUBLICATIONS

M. Dumas, M. Reichert, and M.-C. Shan (Eds.) BPM 2008, LNCS 5240, pp. 244-260, 2008.*

(Continued)

*Primary Examiner* — Justin M Pats
*Assistant Examiner* — Octavian Rotaru
(74) *Attorney, Agent, or Firm* — Cantor Colburn LLP; Daniel Morris (57) ABSTRACT

Methods, systems and computer program products for improvement of vertical process merging by reconstruction of equivalent models and hierarchical process merging. Embodiments of the invention include a method for identifying and resolving differences between business process models, the method including receiving a first business process model project, identifying a second business process model project, performing changes to the second business process model project, merging the first and second business process model projects, creating a delta model configured to analyze the differences between the business process model projects, wherein an analysis of the differences between the first and second business process model projects are in the form of low-level changes and auto-applying the low-level changes of the first business process model project to generate a new business process model project.

9 Claims, 8 Drawing Sheets

(56) References Cited

U.S. PATENT DOCUMENTS

| | | | |
|---|---|---|---|
| 7,788,201 B2* | 8/2010 | Gschwind et al. | 706/47 |
| 8,018,471 B2* | 9/2011 | Panditharadhya et al. | 345/629 |
| 2001/0052113 A1* | 12/2001 | Hearne et al. | 717/2 |
| 2002/0065701 A1* | 5/2002 | Kim et al. | 705/9 |
| 2002/0069167 A1* | 6/2002 | Conlow | 705/40 |
| 2004/0254945 A1* | 12/2004 | Schmidt et al. | 707/100 |
| 2005/0108294 A1* | 5/2005 | Koerner et al. | 707/200 |
| 2005/0171833 A1* | 8/2005 | Jost et al. | 705/10 |
| 2006/0064667 A1* | 3/2006 | Freitas | 717/104 |
| 2006/0143057 A1* | 6/2006 | Sadiq | 705/7 |
| 2006/0224702 A1* | 10/2006 | Schmidt et al. | 709/219 |
| 2006/0282458 A1* | 12/2006 | Tsyganskiy et al. | 707/102 |
| 2007/0005618 A1* | 1/2007 | Ivanov et al. | 707/100 |
| 2007/0022383 A1* | 1/2007 | Barker et al. | 715/733 |
| 2007/0043733 A1* | 2/2007 | Cannon et al. | 707/10 |
| 2007/0118551 A1* | 5/2007 | Akkiraju et al. | 707/102 |
| 2007/0130180 A1* | 6/2007 | Rasmussen | 707/100 |
| 2007/0233532 A1* | 10/2007 | Koiso et al. | 705/7 |
| 2007/0244910 A1* | 10/2007 | Mital et al. | 707/100 |
| 2007/0245297 A1* | 10/2007 | Kuester et al. | 717/104 |
| 2008/0120129 A1* | 5/2008 | Seubert et al. | 705/1 |
| 2008/0154830 A1* | 6/2008 | Gschwind et al. | 706/47 |
| 2009/0112667 A1* | 4/2009 | Blackwell et al. | 705/7 |
| 2009/0138273 A1* | 5/2009 | Leung | 705/1 |
| 2009/0150860 A1* | 6/2009 | Gschwind et al. | 717/104 |
| 2010/0030732 A1* | 2/2010 | Gschwind et al. | 707/2 |
| 2010/0057666 A1* | 3/2010 | Ziegler et al. | 706/59 |
| 2010/0131421 A1* | 5/2010 | Kuester et al. | 705/348 |
| 2010/0174583 A1* | 7/2010 | Passova et al. | 705/10 |

OTHER PUBLICATIONS

G. Alonso, P. Dadam, and M. Rosemann (Eds.) BPM 2007, LNCS 4714, pp. 198-213, 2007.*

Pottinger, Rachel A. and Bernstein, Philip A., Merging Models Based on Given Correspondences, 29th VLDB Conference, 2003.*

Kuster, Jochen M. et. al A Tool for Process Merging in Business Driven Development, CAISE Forum, 2008.*

Chris Nott, Using Business Service Choreography In Conjunction With An Enterprise Service Bus, IBM Redbooks, REDP-3908, 2004.*

Stephen White, Best Practices for Using WebSphere Business Modeler and Monitor, IBM Redbooks, REDP-4159-00, 2006.*

Ehrig et al, Generating instance models from meta models, 479-500, Springer 2008.*

Ehrig et al, Generating Instance Models from Meta Models, LNCS 4037, p. 156-170, IFIP, 2006.*

Gschwind et al, Applying Patterns during Process Modeling, BPM, LNCS 5240, p. 4-19, 2008.*

Koehler et al, Combining Quality Assurance and Model Transformations in Business Driven Development, LNCS 5088, p. 1-16, 2008.*

Kuster et al, Detecting and resoulving process model differences in the absence of a change log, LNCS 5240, 244-260, Springer 2008.*

Kuster et al, Validation of Model Transformations—First Experiences using a white box approch, LNCS 193-204, Springer 2007.*

Kuster Jochen M, Definition and validation of model transformations, p. 233-259, Springer 2006.*

Parsons et al, Extracting Interactions in Component-Based Systems, v34, No. 6, IEEE Nov.-Dec. 2008.*

Ryndina et al, Consistency of Business Process Models and Object Life Cycles, LNCS p. 80-90, MoDELS 2006, Springer 2007.*

Wahler et al, Predicting Coupling of Object-Centric Business Process Implementations, LNCS 5240, p. 148-163, BPM, Springer 2008.*

Zimmermann, Reusable Arhitectural Decision Models for Enterprise Application Development, LNCS 4880, p. 15-32, Springer 2007.* van der Aalst, Inheritance of Business Processes—A Journey visiting four notorious problems, CiteSeer, 2003.*

Kuster et al, Generation of Business Process Mopdels for Object Life Cycle Compliance, LNCS, p. 165-181, BPM, Springer 2007.*

Kuster et al, Improving Inconsistency Resoultion with Side-Effect Evaluation and Costs, LNCS 4735, p. 136-150, MoDELS 2007.*

Sharma et al, Oracle Business Process Analysis Suite, Oracle BPA BPM Product Management, 2006 http://natcapoug.org/sst_NATCAPOUG/presntn_downloads_SOA-SIGspcfc/ncapOSOAprstn20070124_SOA_Oracle-BPA-Suite.pdf.* van der Aalst, Inheritance of Business Processes—A Journey visiting four notorious problems, CiteSeer, 2003 http://citeseer.ist.psu.edu/viewdoc/summary?doi=10.1.1.11.8914.* van der Aalst, The case for Process Mining, 0-7695-2902-x-07, ACSD 2007 IEEE, 2007 http://ieeexplore.ieee.org/stamp/stamp.jsp?tp=&arnumber=4276259.* van der Aalst, Workflow Patterns, Distributed and Parallel Databases, Kluwer Academic Publishers, 2003 http://clip.dia.fi.upm.es/Projects/S-CUBE/papers/aalst03:workflow_patterns.pdf http://link.springer.com/content/pdf/10.1023%2FA%3A1022883727209.pdf.*

Xu Li, Business Process Integration, Universitat Stuttgart, Diplomarbeit nr 2152, 2004 http://elib.uni-stuttgart.de/opus/volltexte/2004/1865/pdf/DIP-2152.pdf.*

Merging Workflows: A New Perspective on Connecting Business Processes, [online]; [retrieved on Jan. 26, 2009]; retrieved from the Internet http://ist.psu.edu/yen/publications/Sun_DSS05.pdf.

Faster and More Focused Control-Flow Analysis for Business Process Models through SESE Decomposition, [online]; [retrieved on Jan. 26, 2009]; retrieved form the Internet http://domino.watson.ibm.com/library/cyberdig.nsf/papers/DF5D1D2BCB32A31B8525737900529787/$File/rz3694.pdf.

G. Grossman et al. Definition of Business Process Integration Operators for Generalizations. In Proceedings 7th International Conference on Enterprise Infromation Systems, ICEIS 2005, May 24-28, 2005.

Methodology and Tooling to combine an existing legacy business process model with best-practice industry reference models for Business Transformation. [online]; [retrieved on Dec. 4, 2008]; retrieved from the Internet http://www.zurich.ibm.com/~koe/papiere/rz3663.pdf.

Improving Business Process Models with Reference Models in Business-Driven Development, [online]; [retrieved on Dec. 4, 2008]; retrieved from the Internet http://www.zurich.ibm.com/~koe/papiere/BPM-DesignWS06.pdf.

Compiling Process Graphs into Executable Code, [online]; [retrieved on Dec. 4, 2008; retrieved from the Internet http://www.zurich.ibm.com/~koe/papiere/gpce04.pdf.

Behavior based Integration of Composite Business Processes, [online]; [retrieved on Dec. 4, 2008]; retrieved from the Internet http://bpm2005.loria.fr/files/PDFs/Session3/Grossmann.pdf.

A Canonical Scheme for Model Composition, [online]; [retrieved on Dec. 4, 2008]; retrieved from the Internet http://wwwhomes.cs.utwente.nl/~kurtev/files/ModelComposition-ECMDAFA2006.pdf.

Business Process Design by View Integration, [online]; [retrieved on Dec. 4, 2008]; retrieved from the Internet http://wi.wu-wien.ac.at/home/mendling/publications/06-BPD.pdf.

The Program Structure Tree: Computing Control Regions in Linear Time, [online]; [retrieved on Dec. 4, 2008]; retrieved from the Internet http://lss.ices.utexas.edu/Publications/Papers/PLDI1994.pdf.

Difference and Union Models, [online]; [retrieved on Dec. 4, 2008]; retrieved form the Internet http://www.tucs.fi/publications/attachment.php?fname=TR527.pdf.

Change Patterns and Change Support Features—Enhancing Flexibility in Process-Aware Information Systems, [online]; [retrieved on Dec. 4, 2008]; retrieved from the Internet http://dbis.eprints.uni-ulm.de/335/1/DKE_WRR08.pdf.

* cited by examiner

| CHANGE OPERATION APPLIED ON V | EFFECTS ON PROCESS MODEL V |
|---|---|
| Insert(V,X) | INSERTION OF ELEMENT X INTO PROCESS MODEL V |
| InsertLink(V,X,Y) | INSERTION OF A LINK BETWEEN ELEMENTS X AND Y IN PROCESS MODEL V |
| Delete(V,X) | DELETION OF ELEMENT X FROM PROCESS MODEL V |
| DeleteLink(V,X,Y) | DELETION OF LINK BETWEEN X AND Y IN PROCESS MODEL V |
| ChangeLinkTarget(V,X,Y,Z) | RECONNECTION OF THE LINK TARGET OF THE LINK BETWEEN X AND Y TO Z IN PROCESS MODEL V |
| ChangeLinkSource(V,X,Y,Z) | RECONNECTION OF THE LINK SOURCE OF THE LINK BETWEEN X AND Y TO Z IN PROCESS MODEL V |

| CHANGE OPERATION APPLIED ON V | EFFECTS ON PROCESS MODEL V |
|---|---|
| Insert(V,X,A,B) | INSERTION OF ELEMENT X BETWEEN TWO SUCCEEDING ELEMENTS A AND B IN PROCESS MODEL V |
| InsertParallelFragment(V,A,B,M) | INSERTION OF A PARALLEL FRAGMENT (FORK AND JOIN THAT ARE CONNECTED ACCORDING TO MAPPING M) BETWEEN TWO SUCCEEDING ELEMENTS A AND B IN PROCESS MODEL V |
| InsertAlternativeFragment(V,A,B,M) | INSERTION OF AN ALTERNATIVE FRAGMENT (DECISION AND MERGE THAT ARE CONNECTED ACCORDING TO MAPPING M) BETWEEN TWO SUCCEEDING ELEMENTS A AND B IN PROCESS MODEL V |
| Delete(V,X) | DELETION OF ELEMENT X FROM PROCESS MODEL V |
| DeleteParallelFragment(V,A,B) | DELETION OF A PARALLEL REGION (FORK AND JOIN) FROM PROCESS MODEL V |
| DeleteAlternativeFragment(V,A,B) | DELETION OF AN ALTERNATIVE REGION (DECISION AND MERGE) FROM PROCESS MODEL V |
| Move(V,X,A,B) | MOVEMENT OF ELEMENT X BETWEEN TWO SUCCEEDING* ELEMENTS A AND B IN PROCESS MODEL V |
| DeleteCompleteFragment(V,A,B) | DELETION OF A COMPLETE FRAGMENT FROM PROCESS MODEL V BETWEEN THE ELEMENTS A AND B. ALL ELEMENTS ARE DELETED AS WELL |
| InsertCompleteFragment(V,A,B) | INSERTION OF A COMPLETE FRAGMENT BETWEEN TWO SUCCEEDING ELEMENTS A AND B IN PROCESS MODEL V. ALL ELEMENTS IN THE FRAGMENT ARE INSERTED AS WELL |

VERTICAL PROCESS MERGING BY RECONSTRUCTION OF EQUIVALENT MODELS AND HIERARCHICAL PROCESS MERGING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field

This invention relates to business transformation, and particularly to methods, systems and computer program products for improvement of vertical process merging by reconstruction of equivalent models and hierarchical process merging.

2. Description

Business transformation performs strategic alignment of business and information technology (IT) to deliver enduring on-demand value of continual business innovation and improvement. Business transformation includes several challenges including: 1. analysis and modeling of business strategy and operations to drive business transformation; 2. efficient generation of an IT solution from a business model using techniques from Model-Driven Development (MDD) of software systems; and 3. monitoring and dynamic management of business performance for continual improvement.

Often, in business process models, process merging scenarios include two or more process models that are brought together in order to create an improved business process. One scenario for process merging is the improvement of an existing process model (AS-IS model) by a reference model where some parts of the existing model are preserved and other parts are replaced. Process merging is also used when companies become subject to acquisitions and mergers. In such situations, processes are aligned at the business and IT level. However, differences are also identified and preserved if appropriate. A third scenario arises if two or more different versions of the same process model are to be integrated.

Existing solutions and tools do not offer support for iterative merging of business process models. In particular, they do not address the problem of process merging in the absence of a change log, and they do not show changes in a hierarchical form and with dependencies between changes clearly visualized.

BRIEF SUMMARY

Embodiments of the invention include a method for identifying and resolving differences between business process models, the method including receiving a first business process model project, identifying a second business process model project, performing changes to the second business process model project, creating a delta model configured to analyze the differences between the business process model projects, wherein an analysis of the differences between the first and second business process model projects are in the form of low-level changes, auto-applying the low-level changes of the first business process model project to generate a new business process model project, and merging the first and second business process model projects.

Additional embodiments include a computer program product for identifying and resolving differences between business process models, the computer program product including instructions for causing a computer to implement a method, the method including receiving a first business process model project, identifying a second business process model project, performing changes to the second business process model project, creating a delta model configured to analyze the differences between the business process model projects, wherein an analysis of the differences between the first and second business process model projects are in the form of low-level changes, auto-applying the low-level changes of the first business process model project to generate a new business process model project, and merging the first and second business process model projects.

Further embodiments include a system product for identifying and resolving differences between business process models, the system including a business modeler module configured to generate a first business process model project, an integration modeler module having a second business process model project, wherein the business modeler module is configured to pass the first business process model project to the integration modeler module, wherein the integration modeler module is configured to perform changes to the second business process model project and a delta model configured to analyze the differences between the business process model projects, wherein an analysis of the differences between the first and second business process model projects are in the form of low-level changes.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

Technical Effects

As a result of the summarized invention, technically we have achieved a solution which addresses the business transformation challenge of analysis and modeling of business operations. Exemplary embodiments improve the efficiency of process execution in the business, merge business processes to create a new business process.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments introduce a tool-supported semi-automatic method for dealing with differences and resolving differences between two or more business process models where business process models are created in two different modeling tools and in two different modeling languages. In exemplary embodiments, low level changes are received and are categorized, dependencies of low level changes are calculated in order to compute a possible execution sequence, low level changes are automatically applied in order to produce an equivalent abstract model, the computed model is presented to the modeler who then uses this model together with the original model to decide which changes to apply, the modeler applies selected high level changes in order to produce the final abstract model by merging, applied high level changes are mapped back to low level changes, and low level changes applied are sent back to the tool for manipulating the implementation model. It is therefore appreciated that the methods, systems and computer program products described herein implement the concept of high-level and low-level changes and deduce the low-level changes from high-level changes. In addition, the methods, systems and computer program products described herein execute low-level changes automatically by computing dependencies.

Within business process modeling, business process models may be manipulated in a distributed manner by several modelers, in a similar way as UML models for software modeling or Java source code can be worked on simultaneously by different people. In such cases, changes made in different models are consolidated at some point and an integrated consolidated process model is created. For creating such an integrated process model, differences are analyzed and parts of different copies are merged into the integrated process model.

In business-driven development, business process models are created at different abstraction levels and often with different tools. For example, business process models can be used to create a process model in a business modeler language. At some point in the development process, such a model is converted into the business process execution language (BPEL) and then further manipulated in an integration developer for the business process model. For illustrative purposes, the model represented in the business process model is referred to as the abstract model (or business modeler language model), and the model represented in the business process integration developer as the implementation model (or BPEL model).

One scenario for process model merging arises if changes that are made in the BPEL model are propagated to the business modeler language model that has been used for creating the BPEL model. In such a case, a so-called change analysis report is sent from the integration developer to the business modeler. The change analysis report contains low-level changes regarding each model element and is displayed as a flat list of changes.

In exemplary embodiments, the methods, systems and computer program products described herein manage changes across tools such that the changes can be manipulated in a user-friendly manner. As such, the change analysis report is analyzed in the business modeler and the dependencies between individual low-level changes are computed. Low-level changes are then applied automatically to the original model to construct the business modeler language model that is equivalent of the BPEL model. High-level changes are computed, focusing on the key conceptual elements of the models. Currently, an existing approach is based on a process structure tree and allows identification of high-level-changes. Each high-level change aggregates a number of low-level changes. The business modeler can then apply those high-level changes that are necessary to the original business modeler language model by simultaneously viewing the model that would be the result if all changes were applied. Having finished this step, the high-level changes are mapped onto low-level changes and these are then sent to the integration developer, because the user may not have applied all the changes from the BPEL model to the business modeler language model.

Figure 1:
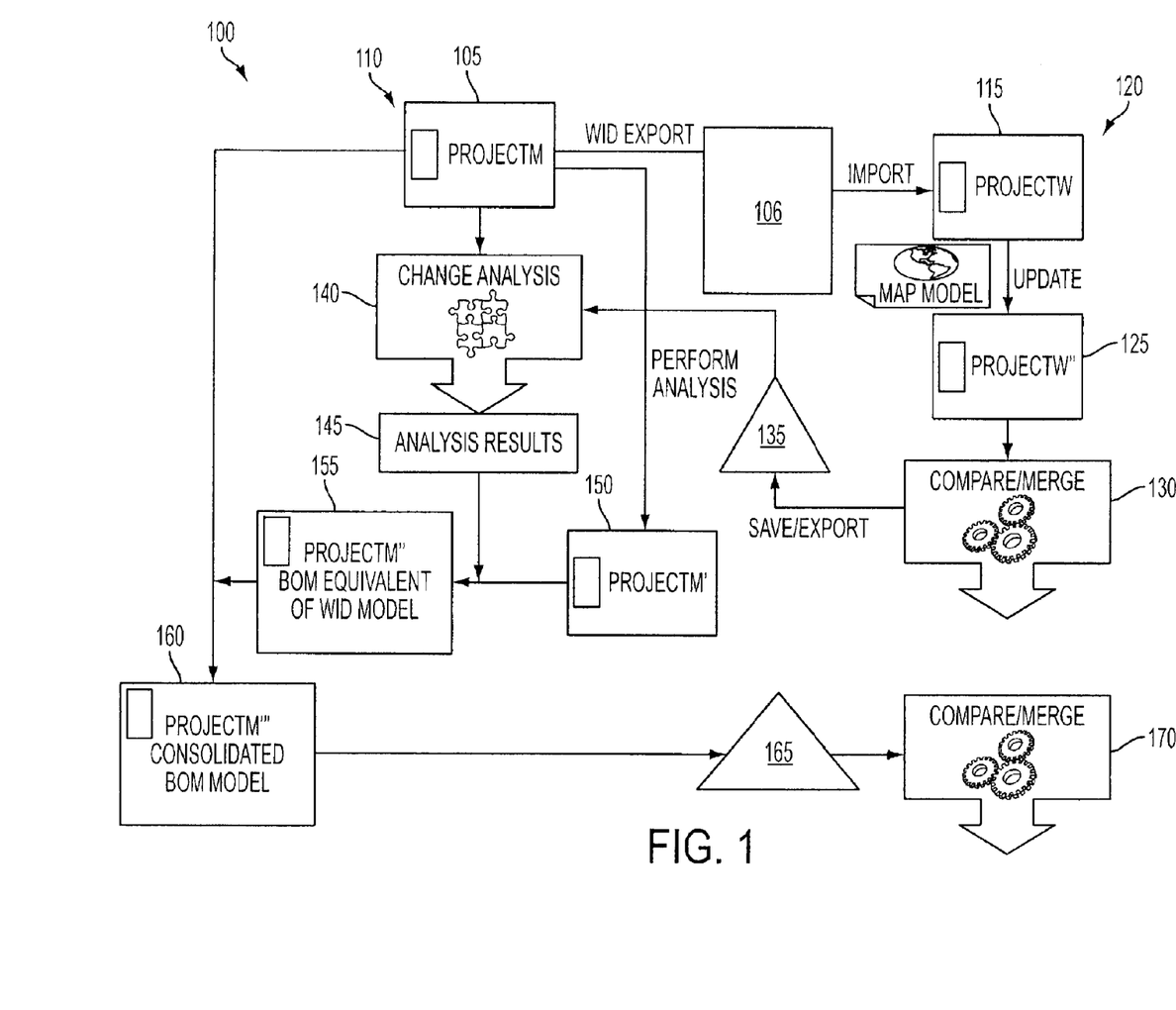
FIG. 1 illustrates a block level flow diagram of an overall approach of a business process model change scenario in accordance with exemplary embodiments.

FIG. 1 illustrates a block level flow diagram of an overall approach of a business process model in accordance with exemplary embodiments. In exemplary embodiments, a business modeler project 105 (referred to as "ProjectM") in a business modeler environment (module) 110 is exported into an integration developer environment (module) 120 having an integration developer project 115 (referred to as "ProjectW"). It is appreciated that the business modeler project 105 can be imported into the integration developer environment 120 via a file system 106. In the integration developer environment 120, further changes can be made to the project 115 resulting in a new integration developer project 125 (referred to as "ProjectW*"). The changes between the integration developer projects 115, 125 can be compared and merged at a compare/merge feature (module) 130 and saved/exported as needed. In addition a delta model 135 for implementation in the business modeler environment 110 is created. A change/analysis feature (module) 140 in the business modeler environment 110 analyzes the delta model 135 and displays the analysis results in form of low-level changes at an analysis results display 145.

In exemplary embodiments, a business modeler project copy 150 (referred to as "ProjectM*") is created that includes a copy (or clone) of business modeler project 105. In exemplary embodiments, all changes of the business modeler project 105 are auto-applied to business modeler project 150 to create a new business modeler project 155 (referred to as "ProjectM"), which is a business modeler language equivalent of the integration developer project 125. Dependencies of low-level changes to the business modeler project 105 are computed. Then, the hierarchical process merging is applied to display changes between project 155 and 150 in a hierarchical manner rather than in a flat list. Using hierarchical process merging, the changes are inspected and then a consolidated business modeler language model 160 (referred to as "ProjectM*") is created. Subsequently, the applied low-level changes are computed and thereby a new delta model 165 is created, which can be implemented in the integration developer environment 120 in a second compare/merge feature 170 to create an updated integration developer model.

In exemplary embodiments, a complimentary scenario can be constructed if a business modeler language model is changed and changes are sent to the integration developer environment 120 where a change analysis report is constructed. Then the entries in this change analysis report can be applied automatically to compute the integration developer equivalent of the business modeler language model. In this way, the merging can be performed in the language with which the modeler is familiar.

In exemplary embodiments, a third scenario arises if in the first scenario the business modeler language model changes at the same time as the integration developer model is changed. In such a case, the different delta files created are compared. As an alternative to this comparison, changes are applied automatically to the original business modeler language model to obtain a first business modeler language and then compare this one with a second business modeler language model that is create while the integration developer model has been changed. Then, the first business modeler language and second business modeler language models can be consolidated.

Figure 2:
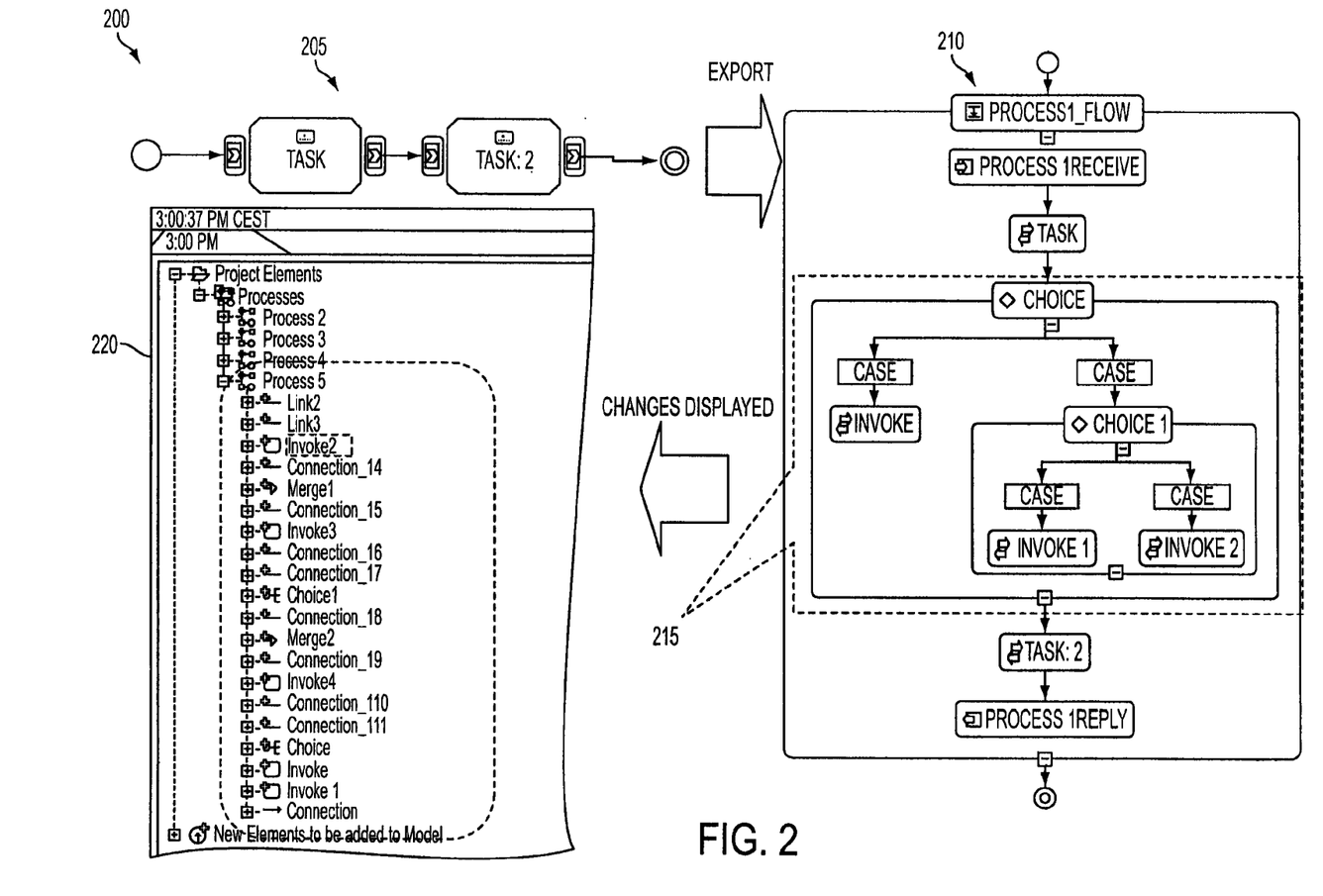
FIG. 2 illustrates sample models of a change scenario between business modeler language models and integration developer models in accordance with exemplary embodiments.

FIG. 2 illustrates sample models 200 of a change scenario between business modeler language models 205 and integration developer models 210 in accordance with exemplary embodiments. FIG. 2 further illustrates low-level changes as they are visualized in a business modeler. Elements 215 newly inserted on the integration developer level gives rise to one or more low-level changes displayed in business modeler 220. As these are displayed in a flat list, it is difficult to know what each change means. In exemplary embodiments, the methods, systems and computer program products described herein distinguish between low-level changes and high-level changes, analyze all low-level changes and detecting a possible execution order, apply all low-level changes automatically to create the business modeler language equivalent of a integration developer model, implement a hierarchical process merging approach to create the new merged business modeler language model, using high-level changes, map high-level changes made in the hierarchical process merging approach to low-level changes, and send the low-level changes back to the integration developer.

Figure 3:
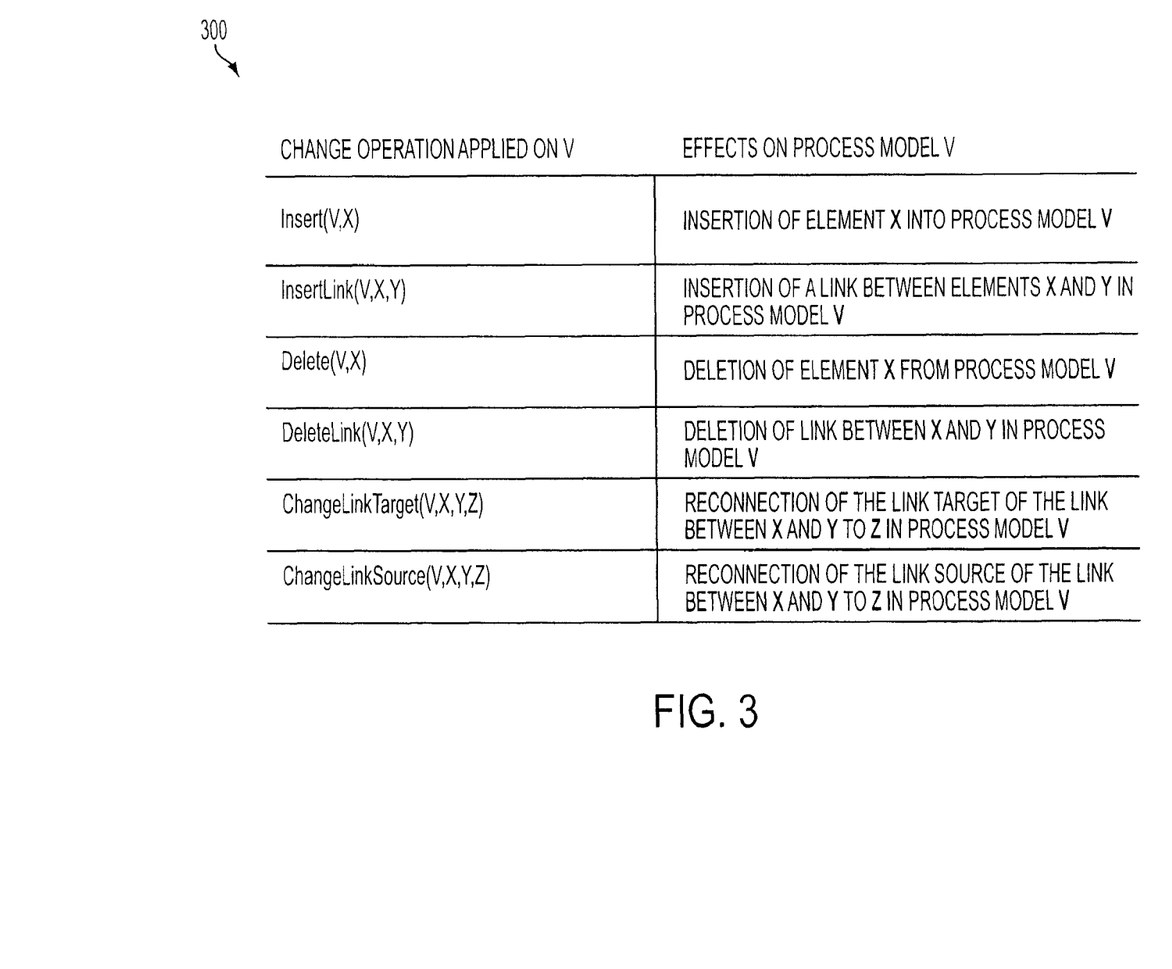
FIG. 3 illustrates an overview chart of low-level change operations.
Figure 4:
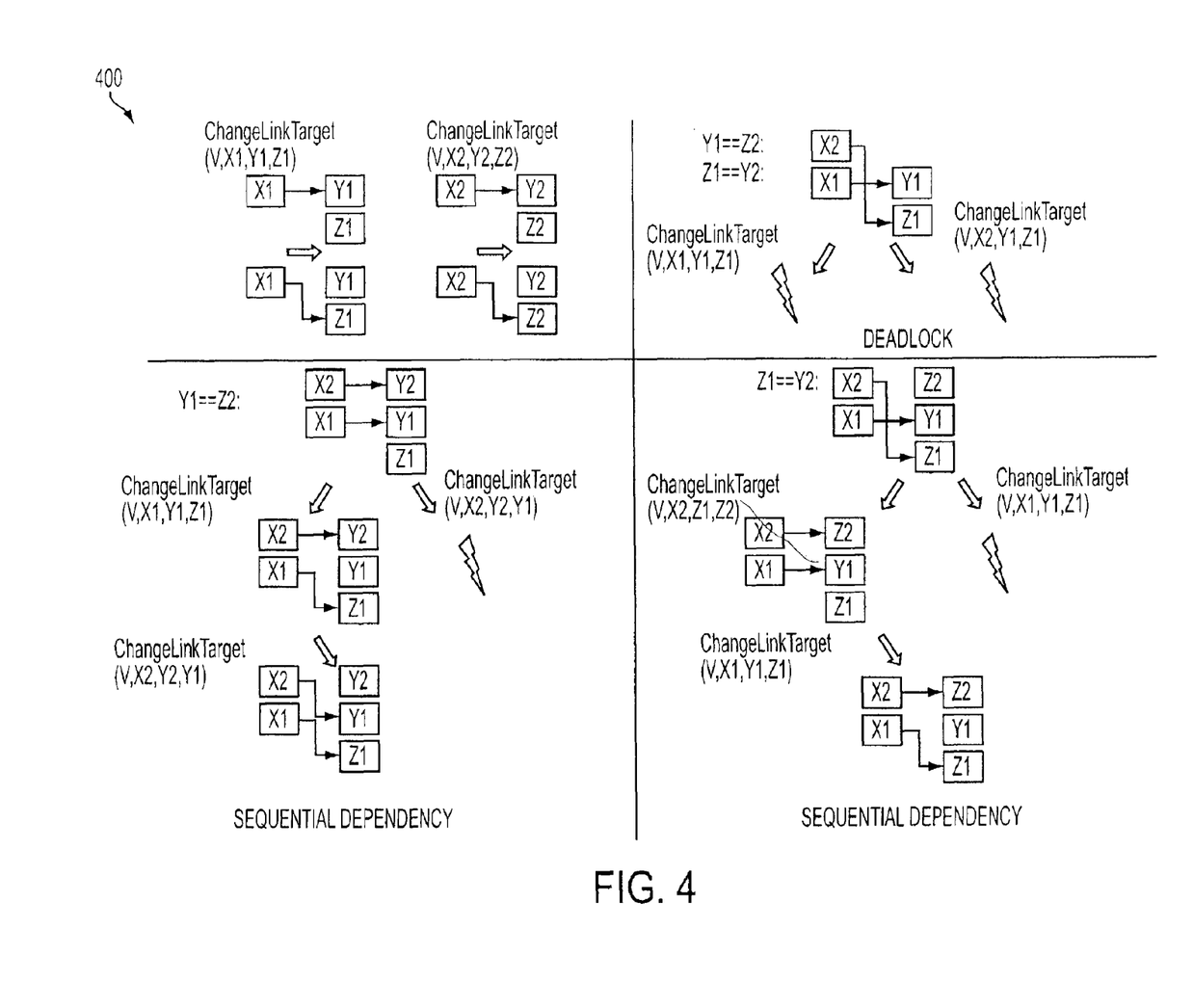
FIG. 4 illustrates a diagram of conflicts between operations in accordance with exemplary embodiments.

FIG. 3 illustrates an overview chart 300 of low-level change operations. FIG. 4 illustrates a diagram 400 of conflicts between operations in accordance with exemplary embodiments. For purposes of discussion, a model element is denoted a plain process element other than a connection. As described above, low-level changes can have dependencies on each other. For example, insertion of a new connection can sometimes only be executed after the corresponding tasks it connects have been introduced. It is due to dependencies between low-level changes that a set of given low-level changes are not automatically applied to a model but are analyzed before to find out possible dependencies. For discussion purposes, a change operation op1 has a dependency to a change operation op2 if the op1 cannot be executed properly before op2 (or vice versa). A conflict-free application sequence of change operations is a sequence of operations where each operation can be properly executed. Furthermore, the concept of independent changes is defined as follows: Two changes c1 and c2 are called (parallel) independent if change c1 and change c2 can be applied in any order, yielding the same result. In addition, the concept of sequentially dependent changes is defined as follows: Two changes c1 and c2 are called sequentially dependent if change c2 requires the application of change c1 (or vice versa). In the case that two changes are not parallel independent, they are in conflict.

A conflict can arise due to the following: Change c1 might delete an element that is required by change c2 or change c1 changes an attribute or value that is required by change c2. In exemplary embodiments, the following order of operation applications represents one basis for a conflict-free application sequence: 1. Execute all insertions of new tasks, subprocesses, decision, merge, fork, join; 2. Execute all deletion of connections; 3. Execute all reconnection of connections; 4. Execute all insertion of new connections; and 5. Execute all deletions of tasks, subprocesses, decision, merge, fork, join.

However, within each group there might be dependencies. There can be no dependencies in the first group and the second group: Insert(V,X1)/Insert(V,X2): If both operations insert a new element, then there are no deletions and as a consequence there can be no dependency; and DeleteLink(V, X1,Y1)/DeleteLink(V,X2,Y2): Potentially, there can be a conflict here because both operations delete a link. However, as X1!=X2 and Y1!=Y2, no conflict arises.

Figure 5:
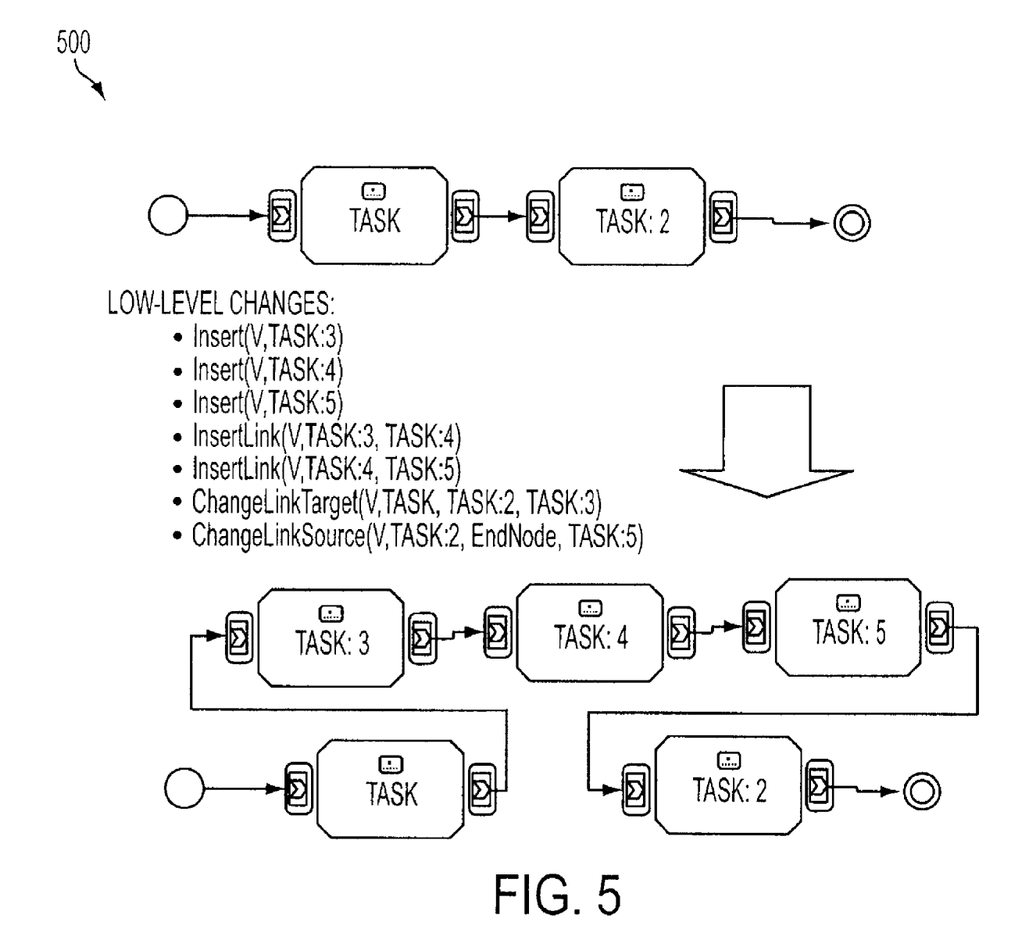
FIG. 5 illustrates an diagram of a dependency example in accordance with exemplary embodiments.

In the third group, the reconnections of links can involve dependencies. A typical example arises in FIG. 5, which illustrates a dependency example chart 500. In FIG. 5, the change operation ChangeLinkTarget can only be executed after the change operation Insert(V,Task:3) has been applied. In a similar form, the change operation ChangeLinkSource has dependencies to the change operation Insert(V,Task:5). As all insertion operations are executed prior to ChangeLinkSource/ChangeLinkTarget operations, these dependencies cannot occur. However, in addition, there can also be dependencies between ChangeLinkTarget/ChangeLinkSource operations themselves. For example, it can happen that a link l1 changes its target, freeing a pin p1, and later a link l2 changes its target, connecting to pin p1.

Further examples of dependencies in the reconnection of links can include (see FIG. 4): ChangeLinkTarget(V,X1,Y1, Z1)/ChangeLinkTarget(V,X2,Y2,Z2): If Y1==Z2, then there is a sequential dependency, because the former change operation must be applied first before the latter becomes applicable. Similarly, if Y2==Z1, then there is a sequential dependency. Further, if Y1==Z2 and Z1==Y2, a deadlock can arise. Similarly, for ChangeLinkSource operations, a sequential dependency can arise for the following scenarios: ChangeLinkSource(V,X1,Y1,Z1)/ChangeLinkSource(V,X2,Y2,Z2): If X1==Z2, there is a sequential dependency, since the latter operations requires that the former was applied first. Similarly, if X2==Z1, then there is a dependency. Further, if X1==Z2 and X2==Z1, a deadlock can arise.

In exemplary embodiments, the insertion of new connections cannot have any dependencies within their group because only new elements are inserted. Furthermore, the deletion of elements may not have dependencies within their group because they delete different elements. For example, Delete(V,X1) and Delete(V,X2) only has a dependency if X1==X2, which cannot occur. In addition, Delete(V,X1) might have dependencies to other operations such as ChangeLinkSource(V,X2,Y2,Z2) (e.g. if X1==X2), however, ChangeLinkSource is always executed prior to Delete operations.

In case of a deadlock, this deadlock can be resolved using user interaction or it can be avoided by not allowing this case on the integration developer side. In exemplary embodiments, the dependency considerations can be transferred into algorithms for computing them automatically. The following example algorithm (Identification of Link Reconnection Dependencies) computes dependencies between link reconnection operations:

```
FindDependenciesBetweenLinkReconnections ( )
{
    Let allLinkOps contain all LinkTargetChange and LinkSourceChange
    Operations
    For each change operation op in allLinkOps do
    {
        dependentOps[op] = markDependencyWithOtherOperation(op,
        allLinkOps);
    }
}
markDependencyWithOtherOperations(op, allLinkOps)
{
    dependentoperations = emptyset;
    for each change operation op2 in allLinkOps do
    {
        if op == ChangeLinkSource(V,X1,Y1,Z1) and op2 ==
        ChangeLinkSource(V,X2,Y2,Z2)
    then
        {
          implement conditions defined above.
          If dependency has been found: dependentoperations.add(op2);
        }
          else if op == ChangeLinkTarget(V,X1,Y1,Z1) and op2 ==
    ChangeLinkTarget(V,X2,Y2,Z2) then
        {
          implement conditions defined above.
          If dependency has been found: dependentoperations.add(op2);
        }
    }
    return dependentoperations;
}
```

In exemplary embodiments, implementing the above algorithm, dependencies between link target changes and link source changes can be computed. Afterwards, a possible application order can be determined by first applying the operation that does not have a dependency, removing this one from the set of dependencies.

In exemplary embodiments, once dependencies between low-level change operations have been determined and a conflict-free application sequence has been computed, this application sequence can be executed to create the business modeler language equivalent of the integration developer model. The algorithm (Automatic Application of Low Level Changes) to apply operations is described as follows:

```
ApplyAllChanges( )
{
    listOfChangeOperations divided into sublists:
    InsertedModelElements, DeletedModelElements,
    InsertedConnections, DeletedConnections and
    ModifiedConnections;
    // insert all new model elements
    for each change operation op in InsertedModelElements do {
        op.apply( );
    }
    // delete all removed connections
    for each change operation op in DeletedConnections do {
        op.apply( );
    }
    // apply all modified connections with respect to given dependencies
    while not ModifiedConnections.isEmpty( ) {
        findDependenciesBetweenLinkReconnections( );
        for each change operation op in ModifiedConnections do {
            if (op.isIndepended( )) { op.apply( ); }
            ModifiedConnections.remove(op);
        }
    }
    // insert all new connections
    for each change operation op in InsertedConnections do {
        op.apply( );
    }
```

-continued

```
    // delete all removed model elements
    for each change operation op in DeletedModelElements do {
        op.apply( );
    }
}
```

Figure 6:
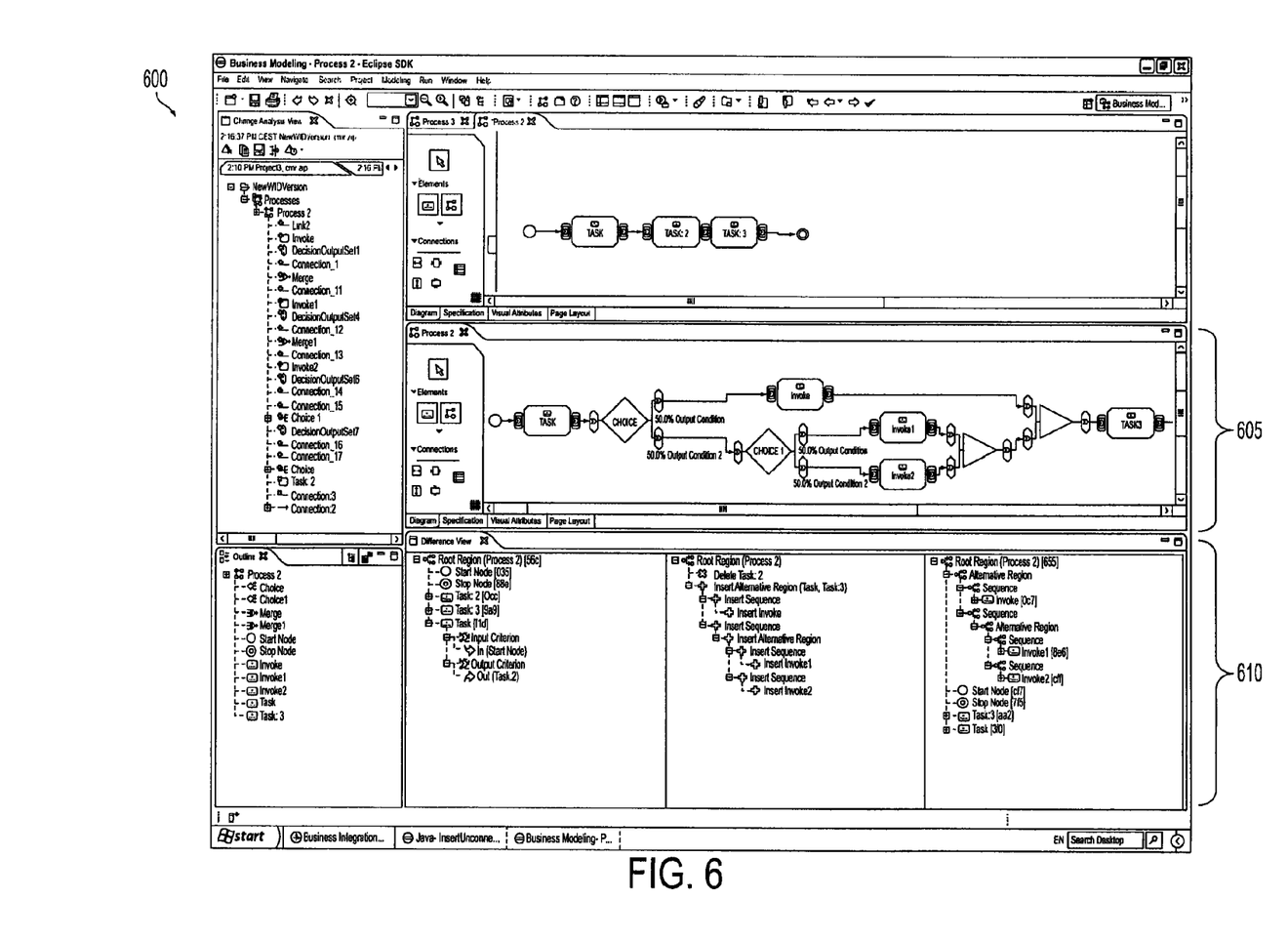
FIG. 6 illustrates a screenshot of an example of integration of hierarchical process merging in accordance with exemplary embodiments.

Subsequently, the business modeler language equivalent of the integration developer model can be viewed and the high-level differences between the two models can be computed. For the example process, the result is shown in FIG. 6. The example screenshot 600 includes a business modeler language equivalent of the integration developer model in section 605. A section 610 further illustrates the hierarchical process merging approach, which can be used for resolving the differences between the two process models.

In exemplary embodiments, in addition to applying all low-level changes automatically, a selection of low-level changes can also be applied automatically. Such a selection can be made based upon a single-entry-single-exit (SESE) fragment or user-interaction. For applying selected low-level changes automatically, the conflicting changes can be computed in advance as described herein.

Figure 7:
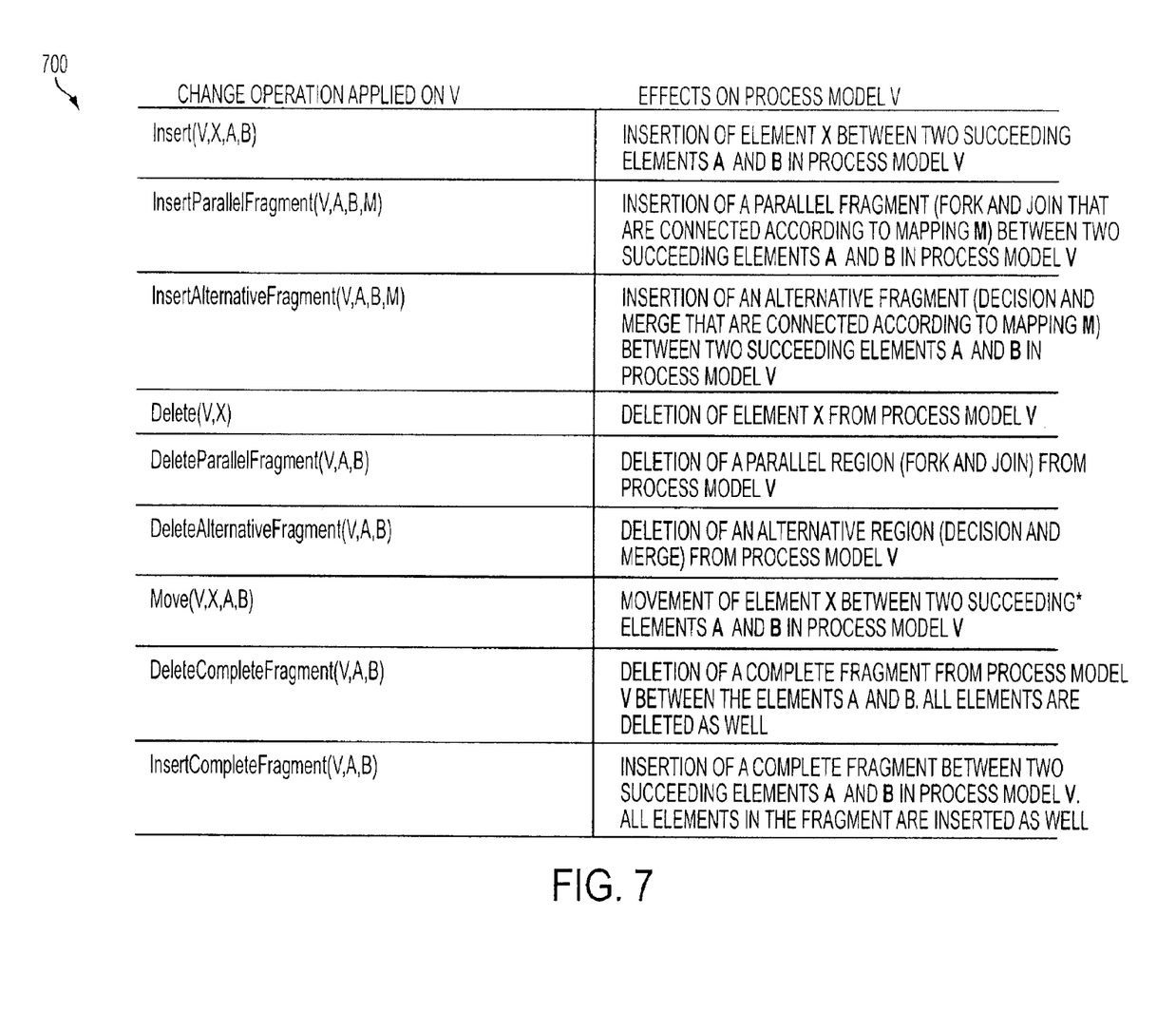
FIG. 7 illustrates a chart of high level change operations.

In exemplary embodiments, hierarchical process merging allows to abstract from low-level changes and apply several low-level changes at once. Hierarchical process merging is based on the concept of SESE fragments. The change operations used in hierarchical process merging are described in FIG. 7, which illustrates a chart 700 of high-level change operations. In this chart 700, the insertion focuses on the key conceptual elements such as task or subprocess. There are no operations for links because the link changes are incorporated into the operations. For example, inserting a task T between two tasks A and B incorporates to insert the links between A and T and T and B as well. Another high-level change operation is InsertParallelFragment, which inserts a connected Fork-Join construct into the process model. Similarly, the operation InsertCompleteFragment not only inserts a fragment but also copies the content and inserts it into the fragment.

In exemplary embodiment, the high-level change operations have the advantage that they encapsulate several low-level change operations. In addition, applying high-level change operations also helps to ensure that a correct process model is created.

In exemplary embodiments, after creating a new merged process model, the committed changes are identified and sent back to the integration developer in order to update the integration developer model. Each high-level change represents an aggregation of low-level changes and the low-level changes are identified. In exemplary embodiments, methods are described for identification of the low-level changes. A first method is obtained by iterating over all low-level changes and checking whether the change has already been applied. The second method is obtained by remembering low-level changes and then identifying corresponding low-level changes.

In exemplary embodiments, in a first method, one approach to identify low-level changes that have been performed by high-level changes is specified in the following algorithm (Identification of low-level changes after changing the model using high-level changes):

```
Input:   1) Set of low level changes LowLevelChanges
         2) Model which has been manipulated by some high-level
            changes
Output: Set of applied low level changes
appliedchanges := empty;
for each low_level_change in LowLevelChanges do
{
    if low_level_change == "Insert(V,X)"
    {
        if model contains X then
        appliedchanges.add(low_level_change);
    }
    if low_level_change == "Delete(V,X)"
    {
        if model does not contain X then
        appliedchanges.add(low_level_change);
    }
    if low_level_change == "InsertLink(V,X,Y)"
    {
        if model contains link between X and Y then
        appliedchanges.add(low_level_change);
    }
    if low_level_change == "DeleteLink(V,X,Y)"
    {
        if model does not contain link between X and Y then
        appliedchanges.add(low_level_change);
    }
    if low_level_change == "ChangeLinkTarget(V,X,Y,Z)"
    {
        if model contains link between X and Z then
        appliedchanges.add(low_level_change);
    }
    if low_level_change == "ChangeLinkSource(V,X,Y,Z)"
    {
        if model contains link between Z and Y then
        appliedchanges.add(low_level_change);
    }
}
return appliedchanges;
```

In exemplary embodiments, another approach for identifying low level changes that have been executed by performing high-level changes can be obtained by the following: While performing high-level changes, each high-level change performed is recorded in a log. After finishing the application of high-level changes, for each high-level change, the appropriate low-level changes are identified, based on the following mapping:

Insert(V,X,A,B): For such a high-level change, the list of low-level changes should be searched for the following entries: Insert(V,X), InsertLink(V,A,X), InsertLink(V,X,B), ChangeLinkTarget(V,A,?,X), ChangeLinkSource(V,?,B,X).

InsertParallelFragment(V,A,B,M): For such a high-level change, the list of low-level changes should be searched for the following entries: Insert(V,Fork), Insert(V,Join), InsertLink(Join, Fork).

InsertAlternativeFragment(V,A,B,M): For such a high-level change, the list of low-level changes should be searched for the following entries: Insert(V, Decision), Insert(V, Merge), InsertLink(Decision,Merge).

Delete(V,X): For such a high-level change, the list of low-level changes should be searched for the following entries: Delete(V,X), DeleteLink(V,X,?), DeleteLink(V,?,X).

DeleteParallelFragment(V,A,B): For such a high-level change, the list of low-level changes should be searched for the following entries: Delete(V,Fork), Delete(V,Join), DeleteLink(V,Fork,Join).

DeleteAlternativeFragment(V,A,B): Similar to DeleteParallelFragment.

Move(V,X,A,B): This high-level change can be recognized if an element has link reconnections. We have to search for the following entries: ChangeLinkTarget(V,?,?,Z), ChangeLinkSource(V,?,?,Z).

DeleteCompleteFragment(V,A,B): This high-level change can be recognized by searching for the following entries: Delete(V,Fork), Delete(V,Join) where both Fork and Join must be contained in the fragment defined by A and B. In addition, we have to search for Delete operations for all elements contained in fragment (A,B).

InsertCompleteFragment(V,A,B): This high-level change can be recognized by searching for the following entries: Insert(V,Fork), Insert(V,Join) where both Fork and Join are then defining the fragment (A,B). In addition, we have to search for Insert operations for all elements contained in fragment (A,B).

In exemplary embodiments, if the model has been manipulated using high-level changes, it may not be possible to find corresponding low-level changes that perform the same manipulation. This inability to locate the low-level changes is because sometimes an "intermediate model" can be constructed using high-level changes that could not have been obtained if the model had been modified using low-level changes. In such a case, the user can be notified and the high-level operations that are not completed by low-level changes can be identified. This can be taken into account when constructing the new delta model 165 as discussed in FIG. 1.

Figure 8:
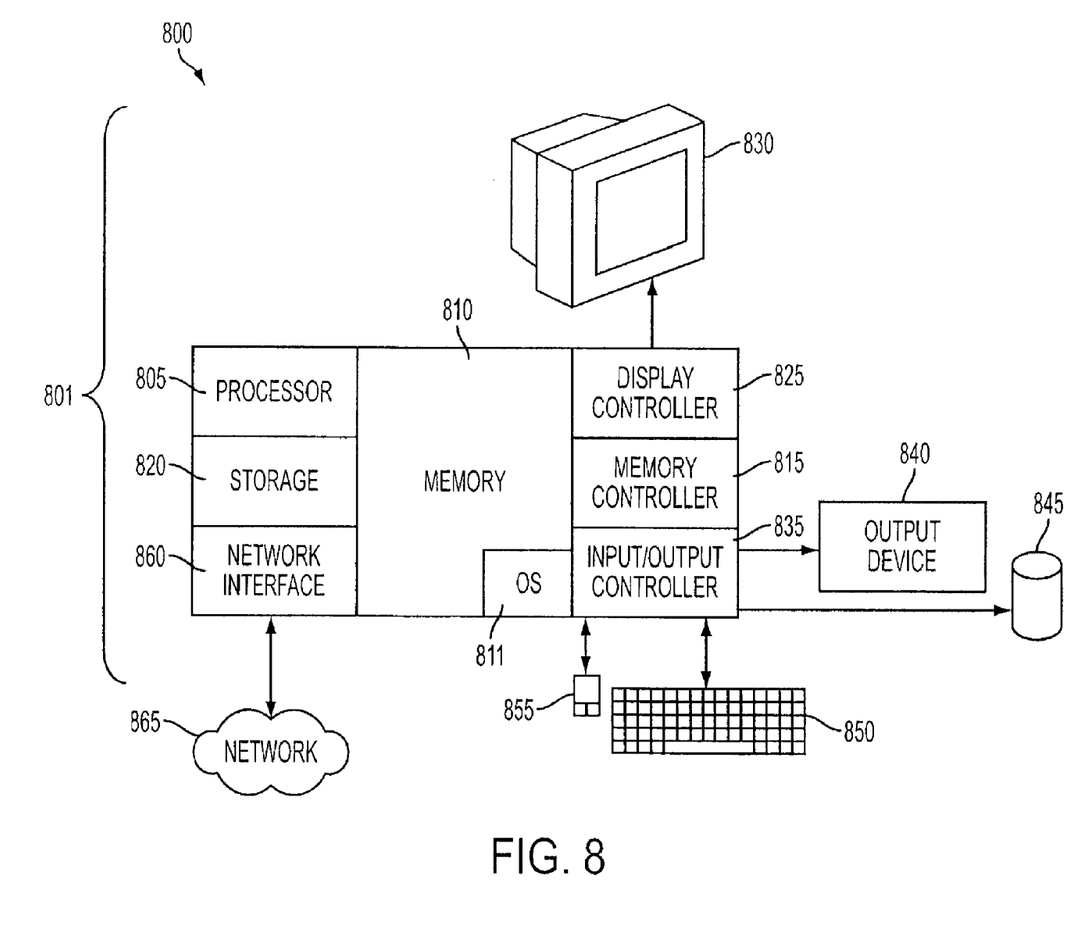
FIG. 8 illustrates an exemplary embodiment of a system for improvement of vertical process merging by reconstruction of equivalent models and hierarchical process merging.

FIG. 8 illustrates an exemplary embodiment of a system 800 for improvement of vertical process merging by reconstruction of equivalent models and hierarchical process merging. The methods described herein can be implemented in software (e.g., firmware), hardware, or a combination thereof In exemplary embodiments, the methods described herein are implemented in software, as an executable program, and is executed by a special or general-purpose digital computer, such as a personal computer, workstation, minicomputer, or mainframe computer. The system 800 therefore includes general-purpose computer 801.

In exemplary embodiments, in terms of hardware architecture, as shown in FIG. 8, the computer 801 includes a processor 805, memory 810 coupled to a memory controller 815, and one or more input and/or output (I/O) devices 840, 845 (or peripherals) that are communicatively coupled via a local input/output controller 835. The input/output controller 835 can be, for example but not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 805 is a hardware device for executing software, particularly that stored in memory 810. The processor 805 can be any custom made or commercially available processor, a central processing unit (CPU), an auxiliary processor among several processors associated with the computer 801, a semiconductor based microprocessor (in the form of a microchip or chip set), a macroprocessor, or generally any device for executing software instructions.

The memory 810 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, and/or other types of storage media.

Note that the memory 810 can have a distributed architecture, where various components are situated remote from one another, but can be accessed by the processor 805.

The software in memory 810 may include one or more separate programs, each of which comprises an ordered listing of executable instructions for implementing logical functions. In the example of FIG. 8, the software in the memory 810 includes the vertical process merging and hierarchical process merging methods described herein in accordance with exemplary embodiments and a suitable operating system (OS) 811. The operating system 811 essentially controls the execution of other computer programs, such the vertical process merging and hierarchical process merging systems and methods described herein, and provides scheduling, input-output control, file and data management, memory management, and communication control and related services.

The vertical process merging and hierarchical process merging methods described herein may be in the form of a source program, executable program (object code), script, or any other entity comprising a set of instructions to be performed. When a source program, then the program needs to be translated via a compiler, assembler, interpreter, or the like, which may or may not be included within the memory 810, so as to operate properly in connection with the OS 811. Furthermore, the vertical process merging and hierarchical process merging methods can be written as an object oriented programming language, which has classes of data and methods, or a procedure programming language, which has routines, subroutines, and/or functions.

In exemplary embodiments, a conventional keyboard 850 and mouse 855 can be coupled to the input/output controller 835. Other output devices such as the I/O devices 840, 845 may include input devices, for example but not limited to a printer, a scanner, microphone, and the like. Finally, the I/O devices 840, 845 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 800 can further include a display controller 825 coupled to a display 830. In exemplary embodiments, the system 800 can further include a network interface 860 for coupling to a network 865. The network 865 can be an IP-based network for communication between the computer 801 and any external server, client and the like via a broadband connection. The network 865 transmits and receives data between the computer 801 and external systems. In exemplary embodiments, network 865 can be a managed IP network administered by a service provider. The network 865 may be implemented in a wireless fashion, e.g., using wireless protocols and technologies, such as WiFi, WiMax, etc. The network 865 can also be a packet-switched network such as a local area network, wide area network, metropolitan area network, Internet network, or other similar type of network environment. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 801 is a PC, workstation, intelligent device or the like, the software in the memory 810 may further include a basic input output system (BIOS) (omitted for simplicity). The BIOS is a set of essential software routines that initialize and test hardware at startup, start the OS 811, and support the transfer of data among the hardware devices. The BIOS is stored in ROM so that the BIOS can be executed when the computer 801 is activated.

When the computer 801 is in operation, the processor 805 is configured to execute software stored within the memory 810, to communicate data to and from the memory 810, and to generally control operations of the computer 801 pursuant to the software. The vertical process merging and hierarchical process merging methods described herein and the OS 811, in whole or in part, but typically the latter, are read by the processor 805, perhaps buffered within the processor 805, and then executed.

When the systems and methods described herein are implemented in software, as is shown in FIG. 8, it the methods can be stored on any computer readable medium, such as storage 820, for use by or in connection with any computer related system or method. In the context of this document, a computer readable medium is an electronic, magnetic, optical, or other physical device or means that can contain or store a computer program for use by or in connection with a computer related system or method. The vertical process merging and hierarchical process merging methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the vertical process merging and hierarchical process merging methods are implemented in hardware, the vertical process merging and hierarchical process merging methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for identifying and resolving differences between business process models, the method comprising:
   receiving, in a processor, a first business process model project;
   identifying, in the processor, a second business process model project;
   performing, in the processor, changes to the second business process model project;
   creating, in the processor, a first delta model configured to analyze, in the processor, differences between the first and second business process model projects, wherein an analysis of the differences between the first and second business process model projects are in the form of low-level changes;
   calculating, in the processor, dependencies of the low-level changes and a conflict-free application sequence of change operations of the first business process model project and the second business process model project, wherein the conflict-free application sequence of change operations includes independent changes defined by one of parallel independent changes and sequentially dependent changes;
   auto-applying, in the processor, the low-level changes and the conflict-free application sequence of change operations of the first business process model project to generate a new business process model project, wherein the low level changes are auto-applied by inserting single-entry-single-exit fragments into the first and second business model projects, wherein the auto-applying of the low level changes of the first business process model project identifies conflicts between the first and second business process model projects prior to merging the first and second business process model projects;
   applying, in the processor, hierarchical process merging to inspect and create a consolidated business modeler language model of the first and second business process model projects;
   creating, in the processor, a clone of the consolidated business modeler language model, wherein the new business process model project is the consolidated business modeler language model equivalent of an integration developer model;
   computing, in the processor, the auto-applied low-level changes to create a second delta model configured based on the first delta model;
   applying, in the processor, the second delta model to the integration developer model to generate an updated integration developer model, wherein a high-level model is changed when the low level changes are applied;
   responsive to changes in the business modeler language model occurring at same time as changes to the updated integration developer model:
      applying changes to the consolidated business modeler language model to obtain a first business modeler language,
      generating a second business modeler language from the updated integration developer model,
      consolidating the first and second business modeler languages, and
      merging, in the processor, the first and second business process model projects based on the consolidated first and second business modeler languages.

2. The method as claimed in claim 1 further comprising computing, in the processor, dependencies of the low-level changes to the first business process model project.

3. The method as claimed in claim 1 wherein the first business process model project is a business modeler project, the second business process model project is an integration developer project and the new business process model project is a new business modeler project.

4. The method as claimed in claim 3 wherein the business modeler project includes the first business modeler language.

5. A computer program product for identifying and resolving differences between business process models, the computer program product including a non-transitory computer readable medium having instructions for causing a computer to implement a method, the method comprising:
   receiving a first business process model project;
   identifying a second business process model project;
   performing changes to the second business process model project;

creating a first delta model configured to
analyze, differences between the first and second business process model projects, wherein an analysis of the differences between the first and second business process model projects are in the form of low-level changes;
calculating dependencies of the low-level changes and a conflict-free application sequence of change operations of the first business process model project and the second business process model project, wherein the conflict-free application sequence of change operations includes independent changes defined by one of parallel independent changes and sequentially dependent changes;
auto-applying the low-level changes and the conflict-free application sequence of change operations of the first business process model project to generate a new business process model project, wherein the low level changes are auto-applied by inserting single-entry-single-exit fragments into the first and second business model projects, wherein the auto-applying of the low level changes of the first business process model project identifies conflicts between the first and second business process model projects prior to merging the first and second business process model projects;
applying, in the processor, hierarchical process merging to inspect and create a consolidated business modeler language model of the first and second business process model projects;
creating, in the processor, a clone of the consolidated business modeler language model, wherein the new business process model project is the consolidated business modeler language model equivalent of an integration developer model;
computing, in the processor, the auto-applied low-level changes to create a second delta model configured based on the first delta model;
applying, in the processor, the second delta model to the integration developer model to generate an updated integration developer model, wherein a high-level model is changed when the low level changes are applied;
responsive to changes in the business modeler language model occurring at same time as changes to the updated integration developer model:
applying changes to the consolidated business modeler language model to obtain a first business modeler language,
generating a second business modeler language from the updated integration developer model,
consolidating the first and second business modeler languages, and
merging the first and second business process model projects based on the consolidated first and second business modeler languages.

6. The computer program product as claimed in claim 5 wherein the method further comprises computing dependencies of the low-level changes to the first business process model project.

7. The computer program product as claimed in claim 5 wherein the first business process model project is a business modeler project, the second business process model project is an integration developer project and the new business process model project is a new business modeler project.

8. The computer program product as claimed in claim 7 wherein the business modeler project includes the first business modeler language.

9. A system for identifying and resolving differences between business process models, the system comprising:
a first delta model configured to
analyze, in a processor, differences between a first business process model project and a second business process model project in form of low-level changes and
calculate, in the processor, dependencies of the low-level changes and a conflict-free application sequence of change operations of the first business process model project and the second business process model project, wherein the conflict-free application sequence of change operations includes independent changes defined by one of parallel independent changes and sequentially dependent changes;
a business modeler module configured to
generate, in the processor, the first business process model project and pass the first business process model project to an integration modeler module configured to perform, in the processor, changes to the second business process model project;
auto-apply, in the processor, the low-level changes and the conflict-free application sequence of change operations of the first business process model project to generate a new business process model project, wherein the low level changes are auto-applied by inserting single-entry-single-exit fragments into the first business model project and second business model project, wherein the auto-applied low level changes of the first business process model project identifies conflicts between the first and second business process model projects prior to merging the first business process model project and the second business process model project;
apply, in the processor, hierarchical process merging to inspect and create a consolidated business modeler language model of the first business process model project and the second business process model project;
create, in the processor, a clone of the consolidated business modeler language model, wherein the new business process model project is the consolidated business modeler language model equivalent of an integration developer model;
compute, in the processor, the applied low-level changes to create a second delta model configured based on the first delta model;
apply, in the processor, the second delta model to the integration developer model to generate an updated integration developer model, wherein a high-level model is changed when the low level changes are applied; and
responsive to changes in the business modeler language model occurring at same time as changes to the updated integration developer model:
apply changes to the consolidated business modeler language model to obtain a first business modeler language,
generate a second business modeler language from the updated integration developer model,
consolidate the first and second business modeler languages, and
merge, in the processor, the first business process model project and the second business process model project based on the consolidated first and second business modeler languages.

* * * * *